July 1, 1930.  D. C. GARROWAY  1,768,951
CIRCUIT INTERRUPTER
Filed Jan. 2, 1926  2 Sheets-Sheet 1

Inventor,
David C. Garroway
by
atty

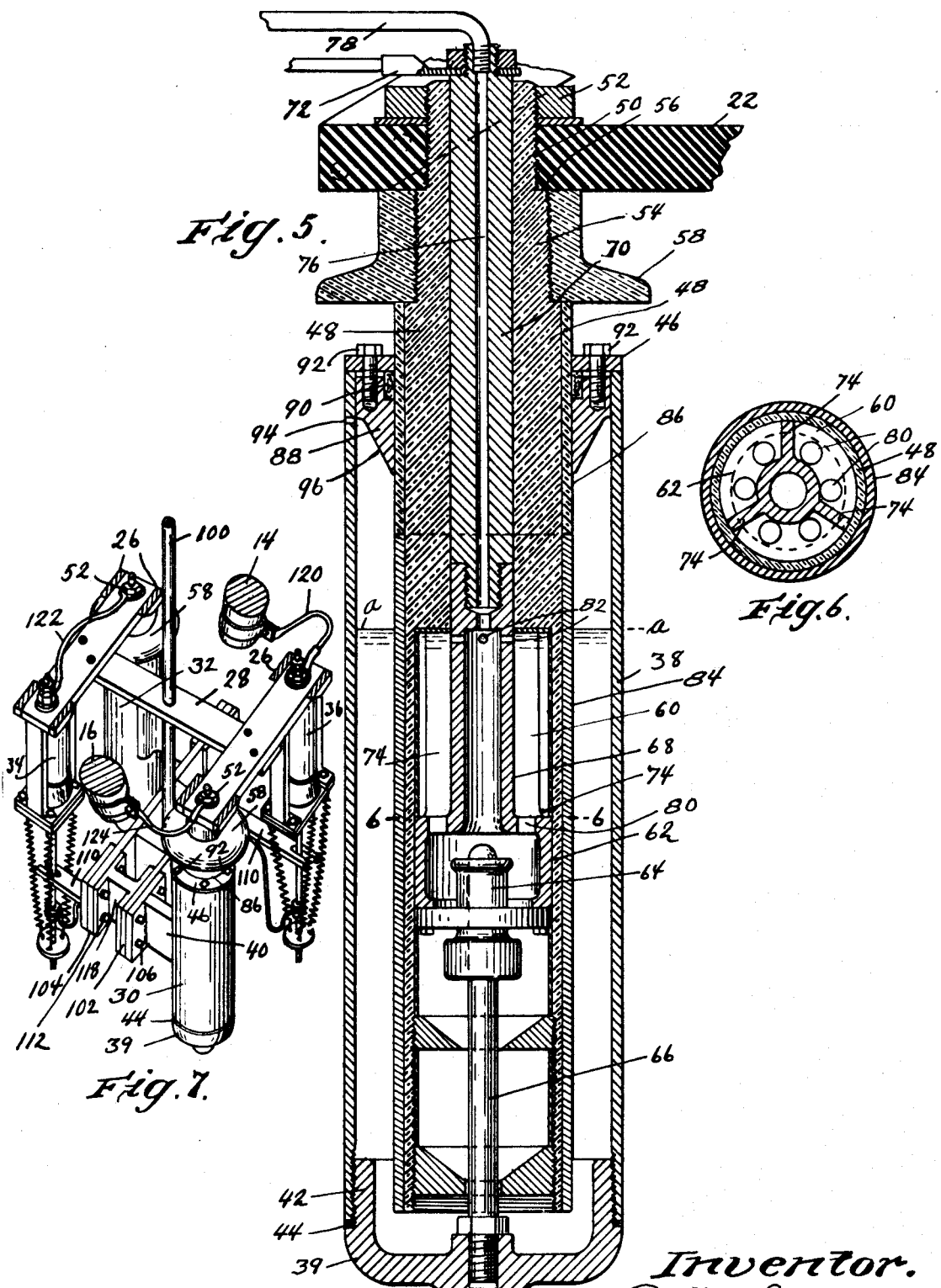

Patented July 1, 1930

1,768,951

UNITED STATES PATENT OFFICE

DAVID C. GARROWAY, OF BELMONT, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

CIRCUIT INTERRUPTER

Application filed January 2, 1926. Serial No. 78,816.

This invention relates to circuit interrupters of the type disclosed in my co-pending application Serial No. 30294, filed may 14, 1925, wherein an electrolyte is employed to assist the circuit interrupting operation.

An object of the present invention is the provision of improved means to utilize the action of the electrolyte in interrupting the circuit.

A further object of the invention is generally to improve the construction and operation of circuit interrupters.

Certain features of this invention are disclosed but not claimed in my co-pending application Serial No. 78,815, filed January 2, 1926, and Serial No. 78,817, filed January 2, 1926.

Fig. 5 is an enlarged sectional elevation of one of the circuit interrupter elements taken along line 5—5 of Fig. 1.

Fig. 6 is a sectional detail taken along line 6—6 of Fig. 5.

Fig. 7 is a diagrammatic perspective view which illustrates particularly the circuit connections between the various circuit interrupting elements.

Figure 1:
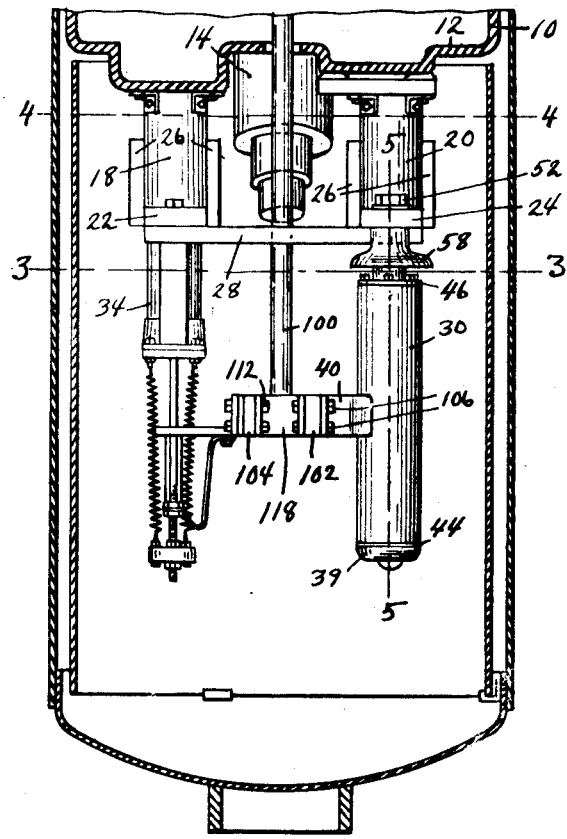
Fig. 1 is a front elevation partly in section of that portion of the circuit interrupter embodying the invention.
Figure 2:
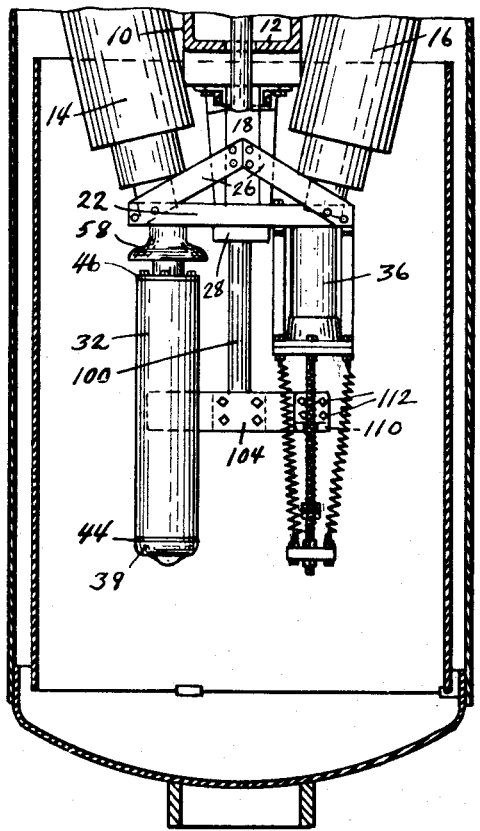
Fig. 2 is a side elevation of Fig. 1.
Figure 3:
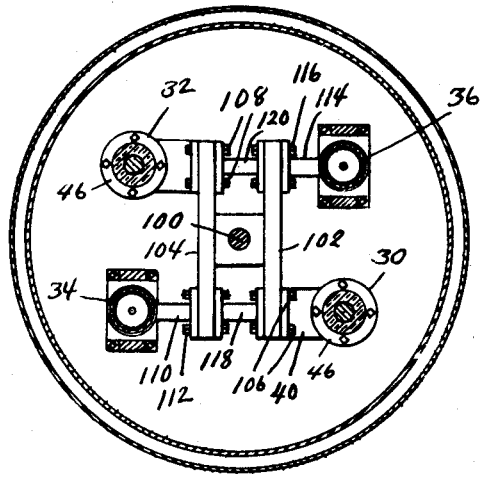
Fig. 3 is a section along line 3—3 of Fig. 1.
Figure 4:
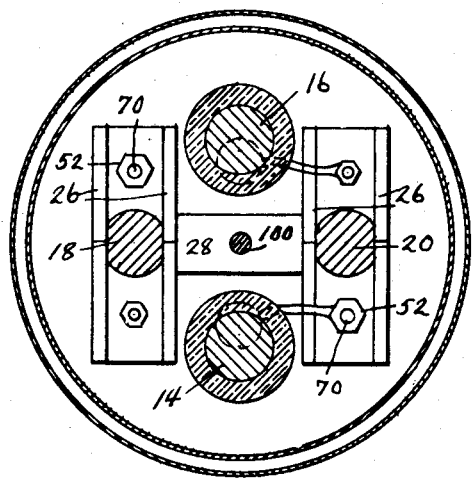
Fig. 4 is a section along line 4—4 of Fig. 1.

The circuit interrupter here shown includes the housing 10 which is adapted to contain the switch operating mechanism. The housing includes the bottom wall 12 by which the stationary components of the switch are adapted to be supported. Switch terminals 14 and 16 are supported by the housing and extend below said bottom wall. The supporting structure for the stationary components of the switch comprises a pair of insulating pillars 18 and 20 which are secured at their upper ends to said wall 12 and depend therebelow. Insulating bars 22 and 24 are secured to the lower ends of said pillars and extend transversely and in parallel relation in both directions beyond said pillars. Braces 26 are secured to the ends of said bars and to said pillars whereby to impart added rigidity to said bars. An insulating cross bar 28 is secured to and is extended between said insulating bars 22 and 24 and serves to guide the movable switch member in its movements between switch open and switch closed positions.

The circuit interrupter here shown comprises a pair of electrolytic circuit interrupter elements 30 and 32 respectively and a pair of oil insulated disconnecting elements 34 and 36 respectively. The circuit is adapted to be interrupted under load in said electrolytic interrupter elements and the circuit through the switch positively disconnected by the separation of contact members in said oil insulated disconnecting elements after the circuit has been interrupted in the electrolytic interrupter elements.

The present invention relates mainly to the construction of the electrolytic circuit interrupter elements. These elements are identical and but one need be described. The electrolytic interrupter element has a movable component which includes a pot 38. Said pot is internally screw-threaded at its lower end and is closed by a cap 39 which has an exteriorly screw threaded boss 42 that is screwed removably into the open end of the tube 38. If desired a packing washer 44 may be interposed between the edge of the pot and the cap, whereby to seal the pot at the cap. The open upper end of the pot is closed by a circular cover plate 46 which preferably is welded to the pot. Said cover plate 46 is formed with a circular aperture therein through which the stationary components of the interrupter are extended.

Said stationary components include an insulating cylinder 48 which is formed with a reduced and screw-threaded upper end 50 that is extended through an aperture in an insulating bar 22, and is fixed therein by means of a nut 52 screw-threaded on said reduced end portion. Said insulator is formed with an intermediate enlarged section 54 which has a shoulder 56 received against the under face of said insulating bar 22 and held in such position by the lock nut 52. An insulating shield or petticoat is secured to said intermediate section 54 and is adapted to extend outwardly beyond said pot 38 and divert away from the pot any electrolyte which may escape from the pot and run down from the surface of the petticoat. Said intermediate section 54 may be externally screw-threaded and said petticoat may be screw-threaded thereon. The screw-threaded joint thereof may be sealed by an insulating varnish which is baked after application, thereby to eliminate possibility of flashover through said joint.

Said insulator is enlarged to its full diameter below said petticoat and the lower portion of said insulator is extended freely through the aperture in the cover plate 46 and into the pot 38.

The lower end of said insulator is formed with an axial recess or chamber 60 therein which extends upwardly within the insulator approximately to the top of the enclosing pot 38. The lower end of said chamber is open into the interior of the pot whereby the electrolyte contained within said pot 38 can flow freely between the pot and said chamber.

A cylindrical conducting housing 62 is disposed within said chamber 60 intermediate its length and is provided with a bell-shaped stationary contact member 64 which may be of any suitable or usual construction.

The cap 39 of said pot is provided with a movable contact member which comprises essentially a cylindrical rod 66 which is extended upwardly into said chamber 60 and is adapted to enter the aperture in and make contact with said bell 64 thereby to complete the metallic circuit through the interrupter. When the pot 38 is moved downwardly said rod is withdrawn from said bell and thereby interrupts the metallic continuity of the circuit.

The housing 62 for said contact bell is provided with a stem 68 which extends into an axial passage of the insulator above the chamber therein. A rod 70 is screw-threaded into the upper end of said stem and extends through the passage in said insulator and terminates at the upper end of the insulator with a terminal connector 72 by which connection may be established with an appropriate part of the circuit. Said stem 68 is provided with radial ribs 74, see Fig. 6, which are adapted to bear against the top wall of said chamber 60 and thereby transfer to said insulator 48 any pressures due to circuit interruption which tend to displace said housing 62 upwardly.

A vent channel 76 is formed in said rod 70 and the upper portion of said stem 68 whereby said chamber 60 may be vented to the atmosphere. The upper end of said channel may be provided with a laterally extended vent pipe 78 by which fluid may be conducted away from the live components of the conductor.

The top wall of the housing 62 is formed with a plurality of vent passages 80 by which relatively free fluid communication between the upper and lower portions of said chamber 60 may be established. Passages 82 are provided in the stem 68 whereby communication between the upper end of the compartment 60 and the interior of said stem is provided.

A metal re-inforcing shell or tube 84 is pressed onto the lower portion of said insulator 48 and surrounds said insulator at the chamber 60 whereby to support the wall of said chamber against internal pressures incident to circuit interruption. Preferably said tube is terminated shortly above the top of said chamber 60. As insulating tube 86 is received on the upper end of said insulator above said tube and has approximately the diameter of said tube so that a smooth and practically continuous outer surface is provided. The pot 38 is provided internally and at its upper end with a packing gland 88 through which the insulator 48 is adapted to slide while maintaining the pot approximately fluid tight. Said gland is provided with an internal recess in which a packing ring 90 is received. The packing ring may be compressed into fluid tight engagement with the insulator 48 by means of bolts 92 which serve to draw said gland 88 upwardly towards the cover plate 46.

Said pot 38 is provided with one or more vent passages 94 at its upper end and said gland may be formed with an inclined outer face 96 which serves to divert toward said vents and away from the packing ring any upwardly moving fluid in said pot at said gland. Said vents are extended in a direction to discharge fluid away from the insulating petticoat 58 whereby to maintain the under surface of said petticoat dry.

The electrolyte is adapted normally to fill said pot and said chamber 60 to approximately the level $a$—$a$. Preferably the electrolyte level is sufficiently high to more or less completely fill the chamber 60 although the level may be suitably adjusted to meet specific conditions.

The pot 38 with its contact rod 66 is adapted to be moved downwardly thereby to withdraw the contact rod from the bell contact member 64 and disconnect the metal conducting path through the interrupter.

The separation of the contact members serves to introduce the electrolyte into the circuit through the interrupter. If the electrolyte has relatively low conductivity, a circuit interrupting arc may be drawn when the contact members separate. Some of the electrolyte is vaporized and rises into the upper part of the chamber 60 and collects therein faster than it can be discharged in the vent passage 76. A gaseous pressure is thereby built up in the upper part of the chamber and operates to force out of the lower part of the chamber and around the arc, the electrolyte contained in said chamber. The sweeping action of the electrolyte serves to chill the arc and to assist in quenching it. The operation of the interrupter may be varied by varying the conductivity of the electrolyte. If the electrolyte has relatively great conductivity, it may be that no arc will be drawn when the contact members separate. As the pot moves downwardly the column of electrolyte included between the two contact members is elongated so that the resistance of the column is gradually increased as the circuit interrupting movement continues, whereby to choke down the amount of energy passing through the interrupter. It may be that under certain conditions of length of column and resistance of the electrolyte, the electrolyte column will vaporize, as a liquid fuse, and thereby interrupt the circuit. It may also be that no interrupting action will take place until the electrolyte column in said chamber 60 breaks contact with the bell contact member 64. An arc will then be drawn from said bell contact member. The gaseous pressure will then be set up in said chamber 60 to force the electrolyte downwardly out of the bottom of the chamber thereby to attenuate the arc and ultimately to interrupt it. Electrolyte is adapted to flow back into said chamber 60 after the circuit interruption. Before the liquid level has become completely restored, however, the contact members in the oil disconnecting elements 34 and 36 are adapted to separate whereby to interpose an insulating barrier of oil between the two sides of the circuit.

The movable elements of the electrolytic interrupting elements and of the oil insulated disconnecting elements are carried by a movable switch member which includes the vertical movable switch rod 100. Insulating bars 102 and 104 are secured to the lower end of said switch rod and on opposite faces thereof and extend in both directions beyond said switch rod. A bracket 40 of one of the electrolyte containing pots 32 is secured by bolts 106 to one end of the insulating bar 102. The bracket 40 of the other electrolyte containing pot 32 is secured to the opposite end of the bar 104 by bolts 108. The bracket 110 of the disconnecting element is secured to the other end of said bar 104 by bolts 112. The bracket 114 of the other disconnecting element 36 is secured to the free end of said bar 102 by bolts 116. Conducting brackets 118 and 120 are disposed between the ends of said bars 104 and 102 and are secured thereto by the bolts 108 and 116 and 112 and 106 respectively. The arrangement is such that said bolts also serve electrically to connect said disconnecting element 34 with the pot 30 and the disconnecting element 36 with the pot 32. The circuit through said interrupting elements and the switch terminals may be provided by a conductor 120 which connects the switch terminal 14 with the stationary contact member, not shown, of the oil disconnecting element 36. The stationary contact members of the electrolytic interrupter 32 and oil interrupting element 34 are connected electrically by conductor 122. The stationary contact member of the remaining electrolytic interrupting element 30 may be connected with the switch terminal 16 by means of the conductor 124. This arrangement connects all of the interrupting elements in series.

I claim:

1. A circuit interrupter including a fixed homo-diametric insulator having a chamber in the lower end thereof which has an opening in the bottom thereof, a fixed contact member disposed within said chamber above the open bottom thereof, a movable fluid-containing receptacle closely surrounding the lower portion of said insulator and which has a close sliding engagement therewith, and a contact member carried by said receptacle in position to enter said chamber through the open bottom thereof and engage said fixed contact member.

2. A circuit interrupter including a fixed insulator having a chamber in the lower end thereof, a fixed contact member disposed within said chamber above the bottom thereof, a movable fluid-containing receptacle surrounding the lower portion of said insulator, a contact member carried by said receptacle in position to enter said chamber through the bottom thereof and engage said fixed contact member, and means to provide a fluid tight slidable connection between said insulator and the top of said receptacle.

3. A circuit interrupter including a fixed tube closed at the top and having an opening at the bottom, a movable receptacle enclosing said tube, a fixed contact member disposed within said tube, a cooperating contact member carried by said receptacle, said tube and receptacle adapted to contain a liquid to some common level which is normally above said fixed contact member, and the portions of the interior of said tube above and below said fixed contact member having provision for fluid inter-communication through said fixed contact member.

4. A circuit interrupter including a fixed tube closed at the top and having an opening at the bottom, a movable receptacle enclosing said tube, a fixed contact member disposed within said tube, a cooperating contact member carried by said receptacle, said tube and receptacle adapted to contain a liquid to some common level which is normally above said fixed contact member, and the portions of the interior of said tube above and below said fixed contact member having provision for fluid inter-communication about said fixed contact member.

5. A circuit interrupter including a fixed tube closed at the top and having an opening at the bottom, a movable receptacle enclosing said tube, a contact member disposed within said tube and having a passage from end to end of it, a cooperating contact rod carried by said receptacle and arranged to enter the passage in said fixed contact member, said tube and receptacle adapted to contain a liquid to some common level which is normally above said fixed contact member, and the portions of the interior of said tube disposed above and below said fixed contact member having provision for fluid intercommunication through the passage in said fixed contact member.

6. A circuit interrupter including a fixed tube of insulating material having an outer metal shell arranged in intimate contact with the lower portion of the side wall thereof, a movable liquid-containing receptacle surrounding said tube and having a fluid-tight slidable connection therewith, and separable contact members disposed normally within said tube, one of said contact members being carried by said receptacle.

7. A circuit interrupter including a fixed insulator having a chamber in its lower end which is extended upwardly for a substantial distance therein and has an opening at the bottom, a metal shell arranged in intimate contact with the outer face of said insulator about said chamber, a movable fluid-containing receptacle surrounding said insulator about said chamber and having a close sliding engagement with said insulator and its shell, and separable contact members disposed within said chamber and carried respectively by said insulator and receptacle.

8. A circuit interrupter including a fixed tube closed at the top and having an opening at the bottom, a housing disposed within said tube intermediate its length and having passages therethrough which establish fluid communication between the upper and lower portions of said tube, a contact bell carried by said housing, a movable fluid-containing receptacle surrounding said tube, and a contact member carried by said receptacle in position to enter the bottom of said tube and engage said contact bell, said tube and receptacle adapted to contain a fluid to some level which is normally above said housing and contact bell.

9. A circuit interrupter including a fixed insulator having a chamber in its lower end which is provided with an opening at the bottom of the insulator, a fixed housing disposed in said chamber and having a stem which is extended upwardly through said chamber and insulator, a contact member carried by said housing, a movable fluid-containing receptacle surrounding the lower end of said insulator about said chamber, and a contact member carried by said receptacle in position to enter the open bottom of said chamber and engage the aforesaid contact member.

10. A circuit interrupter including a fixed insulator having a chamber at its lower end which is provided with an opening at the bottom of the insulator, a fixed hollow housing disposed within said chamber and having a hollow stem which extends upwardly through said chamber and through said insulator, a contact member carried by said housing, a movable fluid-containing receptacle surrounding the lower portion of said insulator about said chamber, and a contact member carried by said receptacle in position to enter the open bottom of said chamber and engage the contact member therein, said receptacle and chamber adapted to contain a fluid which is normally at some level above said housing in said chamber, and the portions of said chamber above and below said housing having provision for fluid inter-communication through said housing.

11. In a circuit interrupter a fixed tube closed at the top to form a compartment and having an opening at the bottom and adapted to contain a fluid, a housing disposed within said tube intermediate its ends and provided with a plurality of ribs which extend axially of and engage the top wall of the tube compartment, a contact member carried by said housing and a cooperating contact member movable within said tube through the opening at the bottom thereof.

12. In a circuit interrupter a fixed tube closed at the top and provided with an opening at the bottom and adapted to contain a fluid, a housing disposed within said tube intermediate its ends and provided with a plurality of ribs which extend axially of and engage the top closure of the tube, means providing fluid-communication between the tube-spaces between said ribs and the tube-space below said housing, a contact member carried by said housing, and a cooperating contact member movable within said tube through the opening at the bottom thereof.

In testimony whereof, I have signed my name to this specification.

DAVID C. GARROWAY.